United States Patent [19]

Elter et al.

[11] Patent Number: 4,923,670
[45] Date of Patent: May 8, 1990

[54] ROOF REFLECTOR FOR A NUCLEAR REACTOR

[75] Inventors: Claus Elter, Bad Durkheim; Edgar Hornischer, Mannheim; Hermann Schmitt, Winnweiler; Josef Schoening, Hambrueken, all of Fed. Rep. of Germany

[73] Assignee: Hochtemperatur-Reaktorbau GmbH, Dortmund, Fed. Rep. of Germany

[21] Appl. No.: 128,442

[22] Filed: Dec. 3, 1987

[30] Foreign Application Priority Data

Dec. 3, 1986 [DE] Fed. Rep. of Germany ....... 3641284

[51] Int. Cl.⁵ ............................................ G21C 11/06
[52] U.S. Cl. .................................... 376/459; 376/381
[58] Field of Search ............... 376/459, 458, 381, 382, 376/265

[56] References Cited

U.S. PATENT DOCUMENTS

| | | | |
|---|---|---|---|
| 3,607,641 | 9/1971 | Lind | 376/459 |
| 4,199,405 | 4/1980 | Schweiger | 376/458 |
| 4,675,155 | 6/1987 | Schoening | 376/381 |
| 4,728,492 | 3/1988 | Schoening | 376/458 |

FOREIGN PATENT DOCUMENTS 2930279 2/1981 Fed. Rep. of Germany ...... 376/459
3111652 10/1982 Fed. Rep. of Germany ...... 376/458

Primary Examiner—Harvey E. Behrend
Assistant Examiner—Daniel Wasil
Attorney, Agent, or Firm—Robert J. Koch

[57] ABSTRACT

A roof reflector comprising at least three individual layers of tapered layer elements combined in the form of vertical columns. Each column rests on a block column of the lateral reflector. Individual elements are secured by wedges and dowels to permit vertical column movements without constraint. The top and bottom layers comprise gas collector spaces communicating with each other by passage openings in the middle layer. In the top and bottom layers are also slot-shaped passage openings leading to an from the collector spaces. Preferably, they are radially offset relative to the passage openings in the middle layer to obtain good gas mixing as it rises through the reflector.

Such a roof reflector is useful for avoiding roof reflector element damage if one element is vertically displaced relative to an adjacent element. The roof elements are carefully designed to achieve this end and maintain cover utility.

23 Claims, 4 Drawing Sheets

ROOF REFLECTOR FOR A NUCLEAR REACTOR

BACKGROUND OF THE INVENTION

The invention concerns a roof reflector for a nuclear reactor, in particular a high temperature nuclear reactor. The roof reflector extends between a thermal shield and center plug and comprises passages for cooling gas and a plurality of layers of discrete reflector elements. A lateral reflector supports the reflector and surrounds a cylindrical core.

DISCUSSION OF RELATED TECHNOLOGY

A roof reflector is discussed in the safety report regarding the AVR at pages 48 to 51. In that reflector, the layer elements are offset from the upper and lower elements by a third of an element width. There is no connection among the elements or with the lateral reflector. In the event that the lateral reflector becomes vertically displaced, the roof reflector elements are stressed due to the offset arrangement. This stress may lead to damage to the roof reflector.

The offset pattern also inhibits adequate cooling. The individual layers are vertically separated by approximately 12 cm. Due to the required turns and deflections in the separation spaces and offset passage openings, cooling gas does not flow well and does not adequately intermix. This results in inadequate cooling characteristics. That disclosure is herein incorporated by reference.

A roof reflector is also disclosed in U.S. Pat. No. 4,300,984 (DE No. 2 751 065). In order to make the roof reflector self-supporting if the lateral supports fail, edge teeth and locking pieces are associated with the individual hexagon-shaped roof elements. These teeth and locking pieces insure positive axial connections. In normal operation, those connections are not capable of equalizing displacements differences by the lateral reflector. The disclosure is herein incorporated by reference.

SUMMARY OF THE INVENTION

It is an objective of the invention to provide a roof reflector which is capable of compensating for the different stresses while improving the intermixing of the cooling gas.

This objective is attained by tapered elements arranged in layers and vertical columns. Each roof element column is supported on a column of lateral reflector elements. The roof elements are positively connected within the layer, at least with those of the lower layer, and with the lateral reflector. Preferably, three layers are used to form bottom, intermediate, and top sections. A center plug is disposed over the core and is supported by at least one layer. The connection means are designed for guiding vertical movements while inhibiting horizontal and radial displacements.

The center plug has a stepped configuration and is supported by a shoulder in at least one of the layers.

A means for allowing gas to move through the roof reflector is provided. One embodiment uses a collector space formed of recesses in the surfaces of the upper and lower layers which face the intermediate layer. The collector space will extend over several adjacent elements. Opposing collector spaces are connected with each other by vertical passage openings through the intermediate layer. The upper and lower layers also have vertical passage openings from their collector spaces toward the core or toward a superimposed heat exchanger. These axial spaces are radially out of line with passages in the middle layer and are offset relative to the intermediate layer openings.

The advantages of such a structure are many. Including the roof reflector in the formation of the lateral reflector permits vertical displacements to be compensated for without constraint. Mechanical and seismic stresses do not lead to uncontrollable displacements of one or more structural parts and thus to failure of the roof reflector. By means of the radially-offset, axial passage openings, collector spaces, and radial gas patterns within the roof reflector, good intermixing of the gas flow is obtained while maintaining the shielding function of the roof reflector. High thermal stresses are permissible because the entire roof reflector has the configuration of a cantilever girder structure, i.e., without metallic fastening components.

In a preferred embodiment, the radially-offset, axial passages in the upper and lower layers are in the form of slots. The use of such slots for the exits from collector spaces described above further improves gas mixing.

In an advantageous manner, at least one passage opening of the upper and/or the lower layer is connected with the adjacent annular space. This provides the possibility for further gas intermixing.

To increase the stability of the roof reflector against displacements in the radial and azimuthal directions, the elements of a column are secured by securing means for preventing radial and azimuthal displacement. One such means is dowels between contact surfaces. Other means include a supporting ledge between the lateral thermal shield and the ends of the roof elements facing it and means for securing adjacent elements. The clearance between the supporting ledge and the roof reflector elements is dimensioned so that the vertical movement of the elements is not substantially restricted. Some restraint is permitted but should not be of such a magnitude that the element could be damaged during displacement. Between adjacent elements, a groove is formed into adjacent lateral element surfaces for receiving a wedge. The wedge is designed to secure one element against the other.

Means for stabilizing the roof reflector may be associated with the roof reflector around its circumference. The stabilizing means comprises layers of stabilizer blocks connected with the roof reflector element columns in the same manner as the elements are connected with each other. The ends of the stabilizer blocks facing the center are shaped to form guide surfaces for the gas exiting from the passage openings. These additional layers increase the support stability of the tapered roof elements and guide gas flow to downstream heat exchange means.

All passage openings are preferably formed by recesses in the lateral surfaces of adjacent elements.

Also, some means for reducing radiation-induced stress is provided. One exemplary means is parallel and perpendicular slots in the bottom layer of elements on the side facing the core. The depth and number of slots will depend on the stress induced.

With slots, the surfaces of the elements facing the core structure are given a drift-like configuration. These slots limit the radiation-induced stresses generated during the entire operating period to acceptable levels.

The center plug and individual layers of the roof reflector are preferably provided with bores for inserting spherical fuel elements. In addition, absorber rods may be passed through all of the layers of the roof reflector.

BRIEF DESCRIPTION OF THE DRAWINGS

An embodiment of the roof reflector is described below with reference to the drawings, FIGS. 1 to 5.

In the drawings.

DETAILED DESCRIPTION OF THE DRAWINGS

Figure 1:
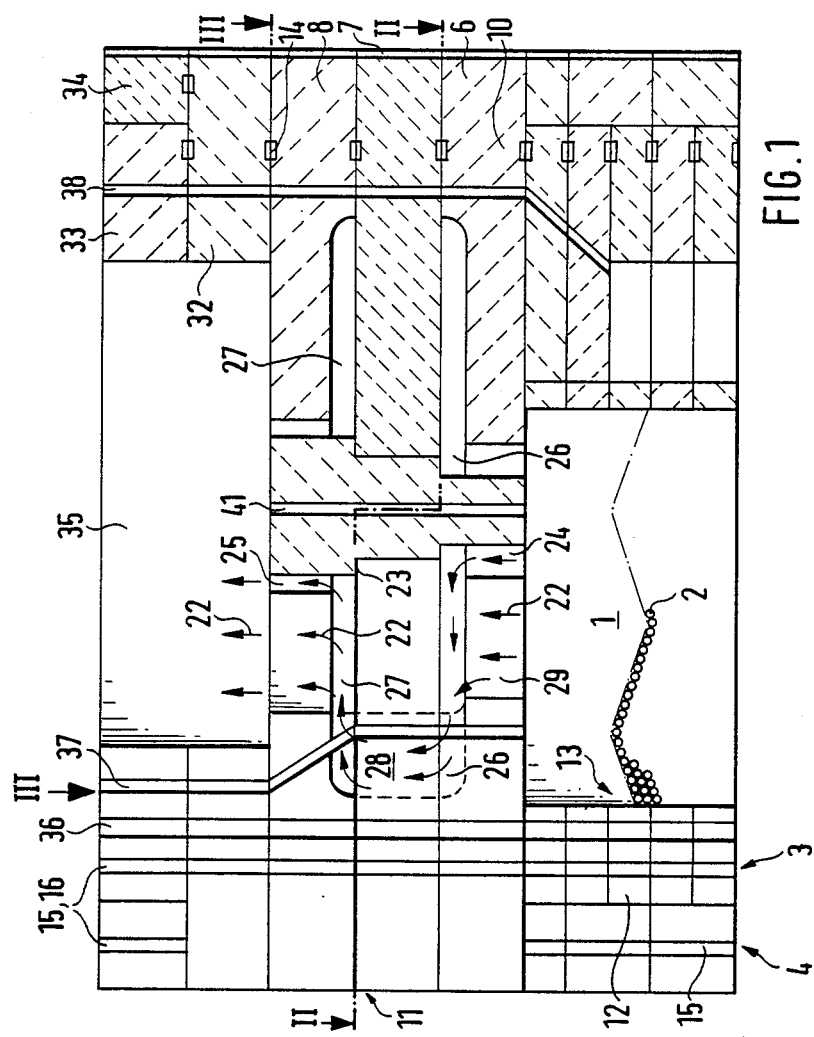
FIG. 1 shows a section through the roof reflector on the line I—I in FIG. 3, together with partial areas of the core structure and the lateral reflector.

In FIG. 1, a cylindrical core structure 1 is indicated. It preferably contains spherical fuel elements 2. The core structure is laterally surrounded by an inner lateral reflector 3, which in turn is encompassed by an outer lateral reflector 4. The core structure 1 is closed off on top by a roof reflector 5, which comprises bottom layer 6, intermediate layer 7, top layer 8, and center plug 9. Each layer is constructed of elements 10 which are tapered (pie-slice) and fit to cover core 1 (FIGS. 2-5). Elements 10 of layers 6, 7 and 8 are placed congruently above each other, so that three elements 10 form column 11. Each column 11 is resting on a single block column 13 of graphite blocks 12 of the inner lateral reflector. The elements 10 of column 11 are secured in position by dowels 14 entering the facing surfaces of the elements 10. Graphite blocks 12 are held in position relative to each other, column 11, and block column 13 of the inner lateral reflector dowels 14. Elements 10 of adjacent columns 11 of the roof reflector 5 are held in position relative to each other by wedges 15. Wedges 15 are guided in grooves 16 worked into lateral surfaces 17 of the elements 10. The wedge joint is laid out together with the dowel connections such that they prevent radial movement of elements 10. Horizontal azimuthal (FIGS. 2 and 3) displacement of the elements 10 is prevented by the supporting ledges 19 (FIGS. 2 and 3) fastened to the thermal shield 18 (FIGS. 2 and 3) which project into grooves 20 of element 10.

Figure 2:
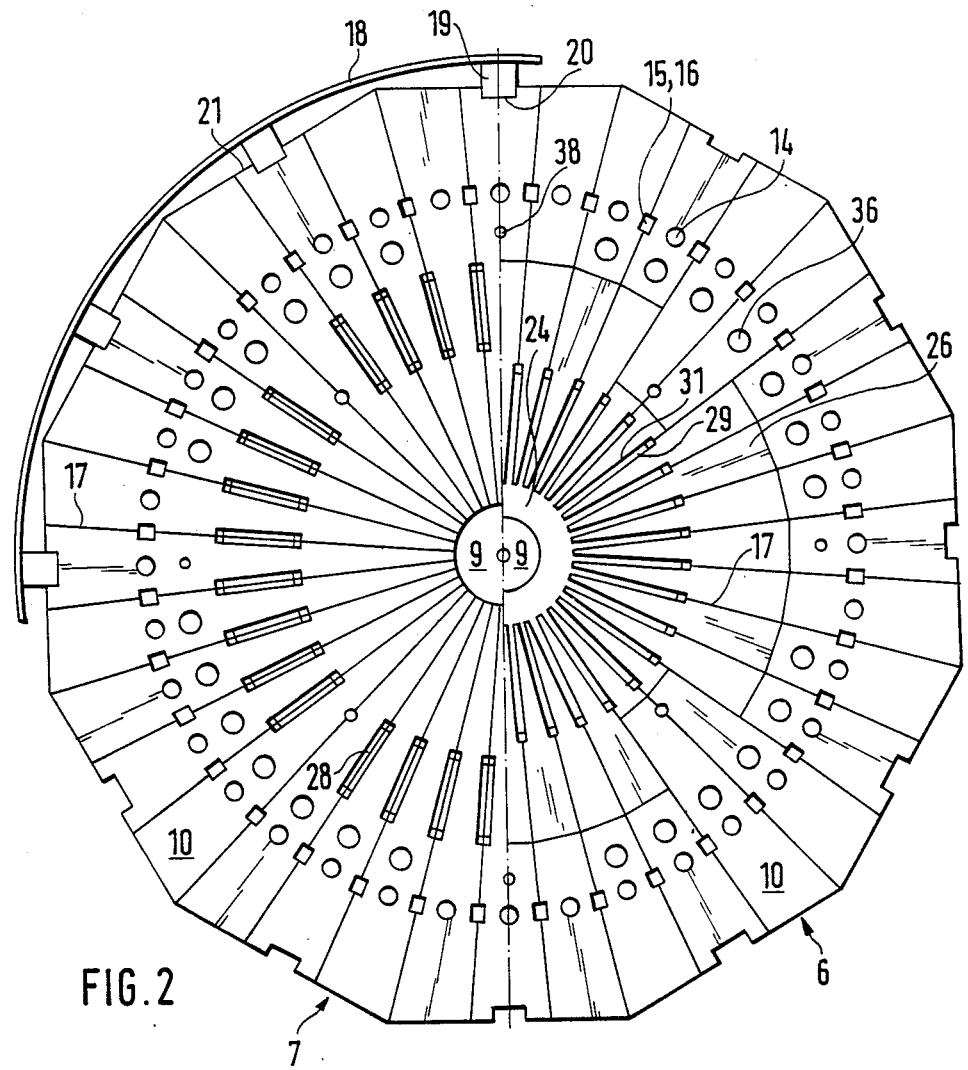
FIG. 2 depicts a section along the line II—II of FIG. 1 with a partial view of the thermal shield.
Figure 3:
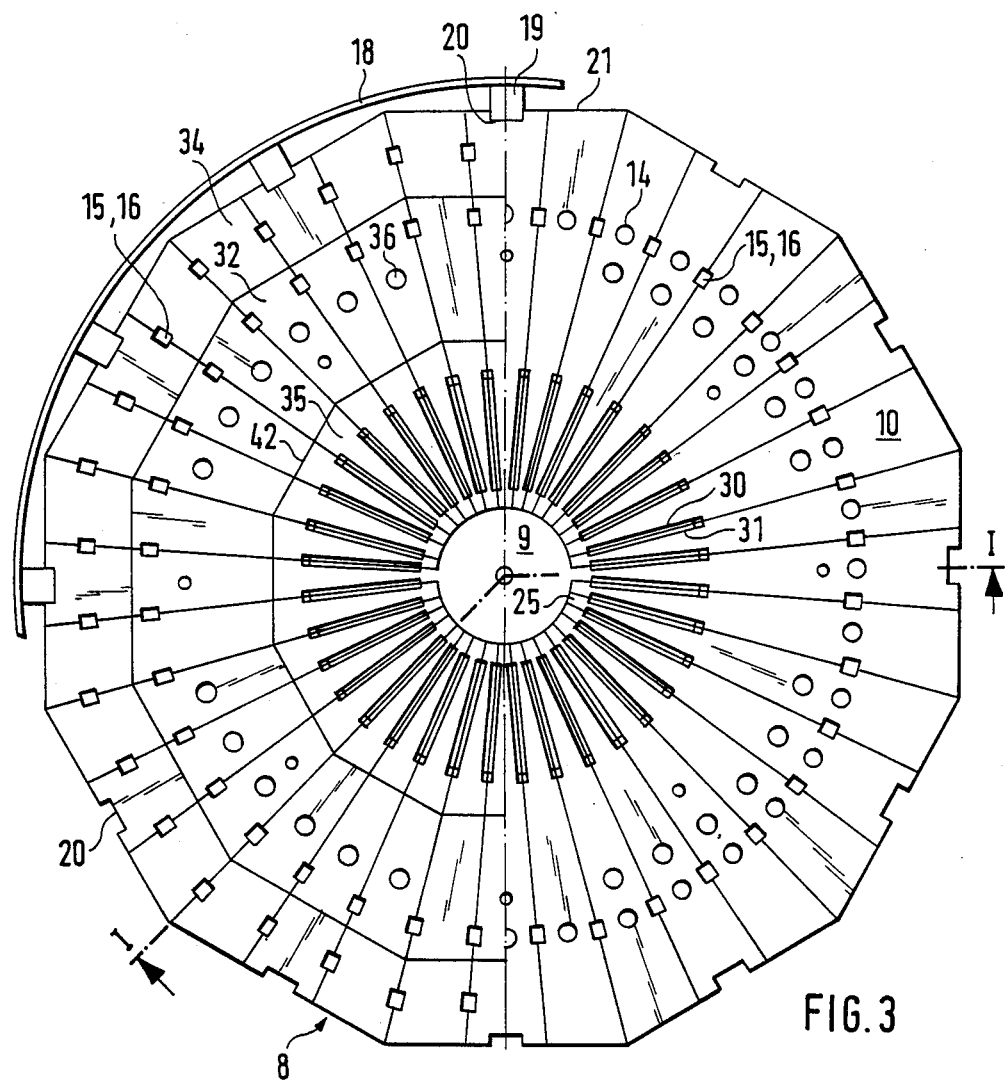
FIG. 3 is a view in the direction of the arrow III, the right hand half whereof represents a section on the line III—III.

The arrangement of roof reflector elements into columns directly associated with block columns of the lateral reflector and positioning the structural parts with dowels and wedges improves the stability and operating safety of the roof reflector. As seen in FIGS. 2 and 3, thermal shield 18 carries a supporting ledge 19 which enhances the stability of the roof reflector and extends at least over the height of column 11. Elements 10 are guided slidingly in groove 20 in frontal surface 21 facing the thermal shield by the supporting ledge 19.

Returning to FIG. 1, hot cooling gas exiting from core 1 flows through roof reflector 5 in the direction of the arrow 22, is deflected and arrives at the steam generator (not shown) located above roof reflector 5 for heat transfer. To provide good intermixing while maintaining its shielding function, the roof reflector 5 may be constructed as follows.

Center plug 9 passes through all layers 6, 7, and 8 and has a series of stepped faces. The first shoulder 23 rests on intermediate layer 7 for support. Elements 10 of intermediate layer 7 abut center plug 9 with little clearance. An annular space 24, 25 is formed between center plug 9 and the ends of elements 10 facing center plug 9. Annular spaces 24, 25 open into the collector spaces 26, 27 worked into the lower and upper surfaces of top and bottom layers 6, 8 facing the intermediate layer 7. As seen in the right hand half of FIG. 2, these collector spaces extend over the width of several elements 10.

Flow passage opening 28 in layer 7 connect opposing collector space 26 and 27 in layers 6 and 8. Radially offset flow passage openings 29 and 30 in layers 6 and 8, respectively, face passage openings 28. Passage openings 28, 29, and 30 are in the form of slots, as seen particularly in FIGS. 2 and 3, formed by two opposing recesses 31 in adjacent lateral surfaces of elements 10 each recess 31 forms half of the opening.

FIG. 2 more clearly shows the radially offset layout of the passage openings. Passage openings 29 and 30 associated with the top and bottom layers 6 and 8 are larger than annular spaces 24 and 25 as seen in FIG. 1. This may also be seen in the right hand half of FIG. 2 showing the bottom layer 6, and in FIG. 3, representing the top layer 8.

To increase the support stability of elements 10, means for increasing the support stability of the elements such as stabilizer blocks 32, 33, and 34 of a carbon material are placed on the periphery of top layer 8. These structural parts are subdivided in a tapering fashion similar to elements 10 of roof reflector 5 so that they represent a continuation of the columns 11 previously described. They are also connected in a similar fashion to the elements of the columns 11, by means of dowels 14 and wedges 15. The unit of a column 11 with block column 13 and the superimposed structural parts 32, 33, and 34 may be seen in the left half of FIG. 1, together with the wedge 15 extending over its entire height. The dowels 14 between layers and sections are not shown in the left half of FIG. 1 as in the right half.

Stabilizer blocks 32, 33 and 34 form a polygon 42 (FIG. 3) with their tapered ends directed toward center plug 9 and circumscribing a free space 35 which serves as a flow guide conduit for gas exiting from passage openings 30 and annular space 25. Absorber rod channel 36 extends through the stabilizer blocks 32, 33, and 24 and layers 6, 7, and 8 and is continued in the inner lateral reflector. Channel 37 is for introducing fuel elements 2 into core structure 1. Channel 38 may be used for introducing absorber balls both extend through layers 6, 7, and 8 and through stabilizer blocks 32, 33, and 34. Bore 41 passes through the center plug 9 and may be used for supplying fuel elements 2 to core structure 1.

Figure 4:
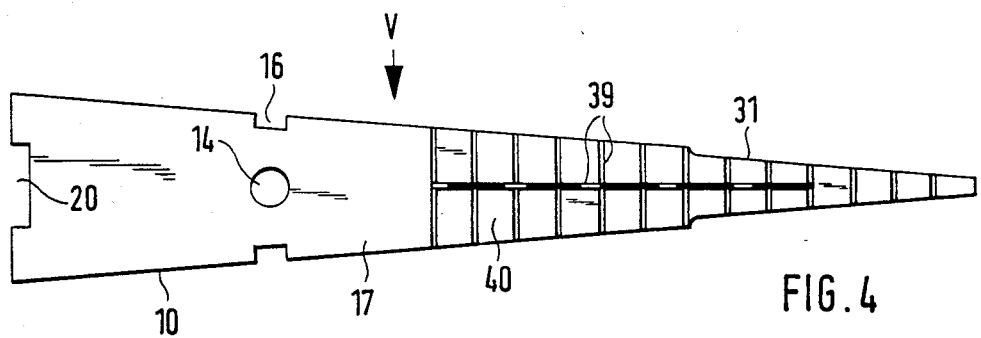
FIG. 4 represents a view of sector-like elements from the side facing the core structure and FIG. 5 illustrates a view in the direction of the arrow V in FIG. 4.
Figure 5:
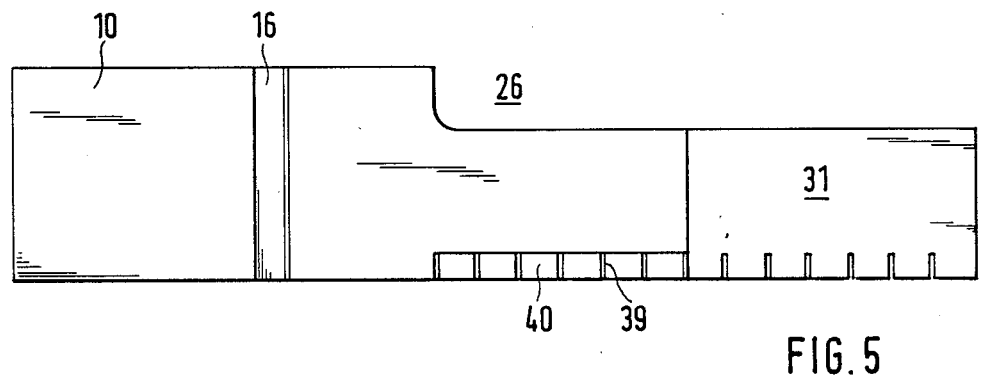

FIGS. 4 and 5 show an element 10 in two larger views. According to FIG. 4, the surface of element 10 facing core structure 1 is provided with means for reducing radiation stress such as slits 39. Preferably and as shown, some combination of parallel and perpendicular slits are used. The resulting drifts 40 between slits contribute in a surprising manner to reducing the radiation stresses generated over the entire operating period to within acceptable values in bottom layer 6. The desired predetermined slit depths and widths are determined as a function of the stress generated.

Although FIG. 4 shows only one element, the drift formation extends to all of the elements of the bottom layer 6. FIGS. 4 and 5 also show recesses 31a which form the passage openings 28 and 29, groove 16 for guiding wedge 15, groove 20 for guiding supporting ledge 19, the position of dowel 14, and the recess to form collector space 26.

Although the invention has been described with reference to one embodiment, the claimed invention should not be limited to the schematic illustrations.

What is claimed:

1. A roof reflector in combination with a nuclear reactor having a thermal shield encircling a lateral reflector of radially oriented blocks aligned in vertically displaceable lateral reflector columns surrounding core, said roof reflector comprising:
   a plurality of annular layers of sector shaped radially oriented elements wherein said layers define a stepped, open central area and are supported on said lateral reflector, said sector shaped elements of said layers are aligned and connected in continuously vertically displaceable columns with said lateral reflector columns, and
   a canter plug exhibiting a stepped configuration corresponding to said stepped central area and disposed in said central area above said reactor core in said nuclear reactor.

2. A roof reflector as in claim 1, further comprising means for preventing radial movement between said continuous vertically displaceable columns.

3. A roof reflector as in claim 2, wherein said means for preventing radial movement comprises dowels connecting said blocks of said lateral reflector columns and said sector shaped elements into said continuous vertically displaceable columns and wedges between said sector shaped elements of said annular layers.

4. A roof reflector as in claim 1, wherein said plurality of annular layers comprises:
   a lower layer resting directly on said lateral reflector,
   an intermediate layer positioned above said lower layer; and
   an upper layer positioned above said intermediate layer.

5. A roof reflector as in claim 4, further comprising means for allowing gas to move through said roof reflector.

6. A roof reflector as in claim 5, wherein said means for allowing gas to move comprises a collector space formed by recessed areas in said upper payer and said lower layer.

7. A roof reflector as in claim 6, wherein said means for allowing gas to move further comprises vertical passages in each of said lower, intermediate, and upper layers.

8. A roof reflector as in claim 7, wherein said passages are substantially rectangular slots.

9. A roof reflector as in claim 7, wherein at least some of said vertical passages are formed by recesses in said sector shaped elements.

10. A roof reflector as in claim 7, wherein vertical passages in said lower layer and in said upper layer are not directly in line with vertical passages in said intermediate layer.

11. A roof reflector as in claim 4, wherein said intermediate layer abuts and supports said center plug.

12. A roof reflector as in claim 1, wherein at least one of said annular layers and supports said center plug at a step surface in said stepped configuration.

13. A roof reflector as in claim 1, wherein said annular layers exhibit:
   element passages into said core.

14. A roof reflector as in claim 1, wherein said sector shaped elements exhibit means for reducing radiation stresses.

15. A roof reflector as in claim 14 wherein said means for reducing radiation stresses comprises at least one slit of a predetermined depth and a predetermined width in a face of said sector element facing toward said core.

16. A roof reflector as in claim 1, further comprising means for increasing support stability of said roof elements.

17. A roof reflector as in claim 16, wherein said means for increasing support stability comprises stabilizing blocks.

18. A roof reflector as in claim 17, wherein said blocks are placed on said upper annular layer and aligned to continue said continuous vertically displaceable columns.

19. A roof reflector as in claim 17, wherein said stabilizing blocks comprise carbon.

20. A roof reflector as in claim 17, wherein said stabilizing blocks are arranged to form a gas conduit for gas passing through said core of said reactor.

21. A roof reflector as in claim 17, wherein said blocks have a tapered configuration.

22. A roof reflector as in claim 1, wherein at least some of said elements have a tapered configuration.

23. A roof reflector as in claim 1, further comprising: supporting ledges fastened to said thermal shield, and wherein said sector shaped elements are grooved to accommodate said supporting ledges so that horizontal azimuthal displacement is prevented.

* * * * *